Dec. 5, 1939.  E. R. PIERCE ET AL  2,182,262
HYDRAULIC BRAKE WHEEL CYLINDER
Filed April 29, 1938
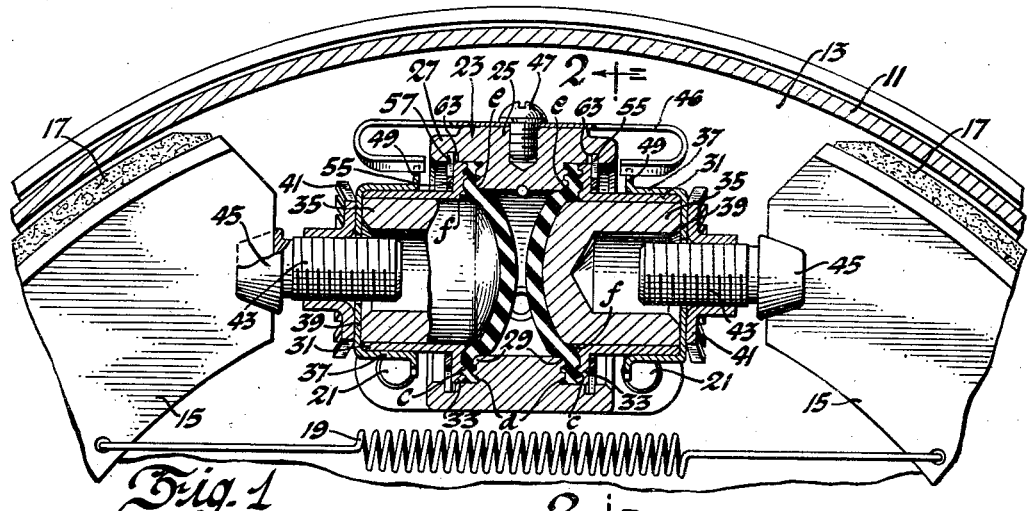
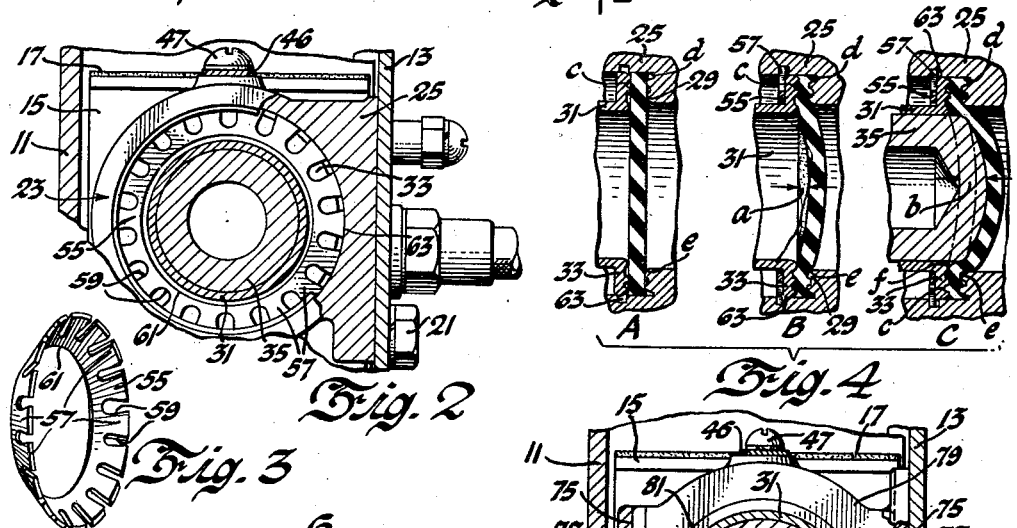
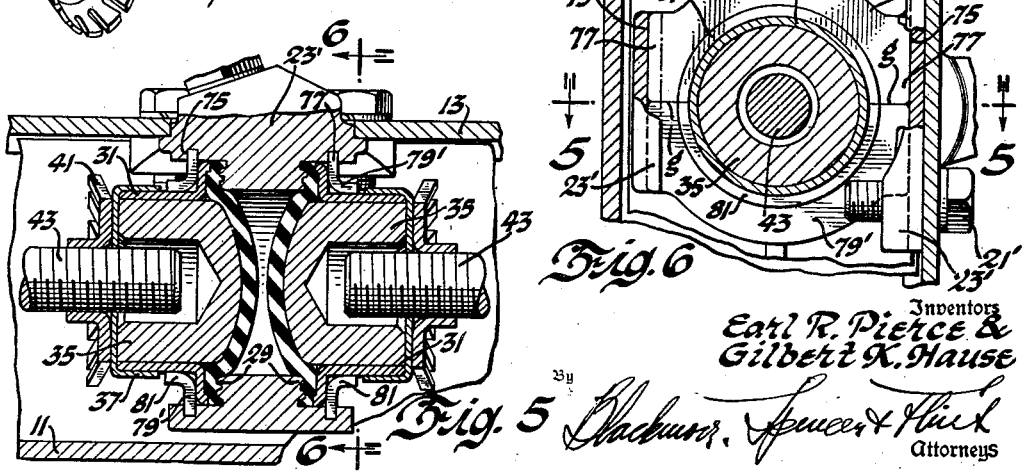
Inventors
Earl R. Pierce &
Gilbert K. Hause
By Blackmore, Spencer & Hurd
Attorneys Patented Dec. 5, 1939

2,182,262

UNITED STATES PATENT OFFICE 2,182,262

HYDRAULIC BRAKE WHEEL CYLINDER

Earl R. Pierce and Gilbert K. Hause, Dayton, Ohio, assignors to General Motors Corporation, Detroit, Mich., a corporation of Delaware Application April 29, 1938, Serial No. 205,030

10 Claims. (Cl. 60—54.6)

This invention relates to fluid motors. It is intended to serve more particularly as an improved wheel cylinder for a hydraulic brake system.

An object of the invention is to provide an improved means for sealing to the cylinder the marginal wall of a flexible diaphragm which is to serve for reciprocating a piston.

As a further object the invention uses a single means to assemble cylinder sleeves to a body member and also to secure the diaphragm.

As a still further object the invention provides a modified form of piston head which is adapted to accommodate a distortion of the diaphragm resulting from the clamping of its periphery, thus minimizing a "sponginess" of the fluid column otherwise present.

Other objects and advantages will be understood from the following description.

Figure 1 shows a vertical section through a brake drum and wheel cylinder.

Figure 2 is a section on line 2—2 of Figure 1.

Figure 3 is a detail in perspective of one of the parts used in the assembly shown by Figure 1.

In Figure 4 are views showing several positions assumed by the diaphragm in the process of assembly.

Figure 5 is a horizontal section through a modified form, the section being taken on line 5—5 of Figure 6.

Figure 6 is a vertical section on line 6—6 of Figure 5.

In the drawing, a conventional brake drum is indicated by numeral 11 and the backing plate is shown at 13. Numeral 15 represents two brake shoes which may be anchored in any convenient way to the backing plate 13. These shoes are equipped with frictional facings 17 as usual. The shoes are withdrawn from contact with the drum by a more or less conventional retracting spring 19.

The wheel cylinder assembly includes a body member 23 which is secured to the backing plate by fastening means 21. The particular wheel cylinder shown is one wherein a leak-proof sealing diaphragm is used, in this respect differing from the more conventional wheel cylinder where leakage is prevented by packing carried by the reciprocating pistons.

More particularly the cylindrical member 23 includes a central body part 25 and rather short axial extensions 27 forming shoulders 29 between the parts 25 and 27. Associated with the body part 25 are cylindrical sleeves 31. These sleeves are formed with radial flanges 33 positioned adjacent the shoulders 29 of the body part 25. The marginal periphery of a flexible non-compressible normally flat diaphragm is intended to be gripped between the shoulder 29 and the flange 33. Slidable within the sleeves 31 are pistons 35. Embracing the end of each cylindrical sleeve 31 is an annular wall 37 of a cup-shaped member the bottom wall 39 of which is in continuous contact with the piston and is intended to also contact the cylinder 31 when the piston is in its retracted position as shown. The cup bottom 39 carries a nut 41 which is threaded to a stem 43. The stem freely enters an opening in the piston and its other end is forked as at 45, to engage the web of the adjacent brake shoe. Rotation of the cup 37 carrying the nut 41 serves to adjust the stem 45 and to move the brake shoes to accommodate lining wear in a well-known way. The adjusted positions are maintained by a yielding retainer 46 secured to the top of the body part 25 by a screw 47. This retainer extends in both directions from point of attachment and is adapted to engage notches in the radial flange 49 formed on the cup 37. This may be replaced with a seat for the shoe web, nonadjustably fixed to cup 39.

The diaphragm is a substantially flat disc of rubber or other flexible incompressible material. To prevent leakage around its marginal edge it is clamped between the shoulder 29 and the flange 33 as stated above. For this purpose there is used a notched annular washer 55 which is preformed to a conical shape as shown. The central opening 61 slides over the sleeve extension 31 with the base or larger diameter toward the sleeve flange 33. An annular locking groove 63 is located axially so that the marginal portion of the diaphragm will be squeezed between flange 33 and shoulder 29; sufficient force being built up from the resilience of the diaphragm to provide an adequate seal. The size of the notches 59 in lock ring 55 is used as a means of adjusting the load required to flatten the initially conical washer and thus force the fingers 57 into groove 63. This load must be less than that required to squeeze the diaphragm to the assembly position, so that this position will not be disturbed when the lock ring is pressed in place. Further, a single motion will suffice to make the assembly when pressing on the edge of the lock ring, no previous compression of the rubber having been made. Thus the lock ring cannot flatten until the groove 63 has been uncovered, when the fingers pop into place. This is automatically the assembly position for the sleeve. The lock ring is made of ductile material, soft steel being satisfactory, in order that it will force into place and not spring out. In so doing the thickness of the rubber at this marginal portion of the diaphragm is reduced. In the views shown in Figure 4, position A represents the diaphragm before its assembly with the other parts. Position B shows the marginal wall clamped in position as described above and it shows the reduced thickness which results from the clamping action. Since the process of clamping takes place throughout the complete circle of the margin of the diaphragm, the displaced material is crowded along radial lines toward the center and the diaphragm is thus converted into the shape of a dome within the circular rim. If a piston with a flat face were to be used with such a diaphragm it would contact the diaphragm along a circular boundary line and within this line the piston head and the diaphragm would form a cavity which would be filled with air. Since the air is compressible, differing in that respect from the hydraulic fluid, the movement of the diaphragm which is intended to spread the shoes into contact with the drum would be accompanied by a compression of the air in the space between the piston head and the diaphragm. As shown in the diagrammatic view this space is represented by the letter $a$. Such a compression of air associated with the movement of the diaphragm is obviously objectionable since it is intended in a hydraulic braking system that the medium through which the pedal operates the brake shall be incompressible. The action has been referred to as "spongy". To avoid this imperfect brake response to pedal pressure, the head or face of the piston has been crowned to an extent to correspond with the dome shape of the diaphragm produced by clamping its periphery. The piston crown radius is preferably less than that of the diaphragm so as to contact in the center first, when being assembled; the diaphragm then wrapping over the crown expelling air. It will be appreciated that the height of this dome will depend upon the character of the material used in forming the diaphragm and also upon the amount of pressure exerted at the periphery. There is therefore a very definite relationship to be observed in the production of a device of this kind between the physical characteristics of the diaphragm material and the applied pressure on the one hand and the extent of the crowning on the face of the piston. Referring once again to the diagrammatic view, the third representation marked C shows the crowned piston assembled with the diaphragm, the piston being so shaped as to fit the dome portion of the diaphragm. This third representation shows another feature which also is illustrated in Figure 1. Excessive internal stresses within a rubber diaphragm are damaging to the diaphragm and reduce its life. It has been found most expedient to dimension the parts so that under the influence of the retracting spring, which restores the piston to the position shown by Figure 1, the diaphragm is distorted from the shape shown by position B. In this way the diaphragm is stressed because of the difference between the radius of curvature of the diaphragm as shown in position B and the radius of curvature of the piston crown and is also given a so-called preload resulting in a change of the diaphragm position from that of position B to that of position C. The extent of this preload is arranged to be a large proportion of the whole piston movement whereby in operating movements no excessive diaphragm distortion occurs. This piston overrun or "preload" is adjusted to a value shown by test to minimize the stress in the rubber, averaged over the life of the brake and consequent increase in piston movement. The relative radial dimensions of the body part 25 and of the piston are so chosen that the rubber diaphragm may snugly fit the piston and prevent the sponginess which would occur were there an air cavity between the piston and the diaphragm. It should be noted also that the shoulder 29 and the flange 33 are recessed to receive the rubber as at $c$ and $d$ when the outer region of the rubber is compressed. The recess $d$ will be seen to be somewhat deeper than the recesses $c$ for the purpose of serving as a kind of reservoir to admit any surplus rubber during the process of compression. The letter $e$ has been applied to show the shape of the rounded part of the shoulder 29. It is so shaped as to insure the snug fit of the diaphragm on the piston and to prevent any excessive size developing in the gap which necessarily occurs at the point $f$.

In Figures 5 and 6 is shown a second embodiment of the invention. In this form the parts corresponding to Figure 1 are indicated by similar reference characters. The body member 23' is provided with cylindrical sleeves 31. The body is formed with vertically extending grooves 75 for the reception of flanges 77 formed on sleeve locks 79, 79'. The locks 79, 79' are also formed with arcuate flanges 81 embracing the sleeves 31. The upper sleeve lock is assembled from above, its flanges 77 sliding in the opposite grooves 75 as may best be seen in Figure 6. The lower sleeve locks are similarly assembled but from below, the flanges sliding in the grooves 75 until contact is made at $g$. The upper sleeve lock is held from escape by the overlying adjustment retainer 46. The lower sleeve lock is held from escape by one of the fastening means 21' which are used to secure the body member 23' to the cover plate. This fastening means 21' may extend to a position adjacent the edge of the sleeve or it may extend along the intermediate part of the sleeve and approach or engage the axial flange 81 as shown in Figure 6.

In this form of the invention the sleeve locks serve to locate the cylindrical members 31 relative to the body part and also to compress the marginal portion of the diaphragm and to convert it into the form of a dome in substantially the same manner as described in connection with Figure 1. In this second form as in the first, the same preloading condition is made use of and is illustrated by the position of the parts shown in Figure 5.

We claim:

1. A fluid motor comprising a body member including a cylinder, a piston reciprocable in said cylinder, a normally flat diaphragm operable under the influence of a movable liquid column to move said piston, means sealing the peripheral margin of said diaphragm to said body and thereby crowding material toward the center thereof whereby said diaphragm is given a dome shape, said piston having a crowned head to engage said dome shaped diaphragm.

2. The invention defined in claim 1, together with yielding means operable to preload said diaphragm in that movement thereof which is responsive to piston movement whereby the amplitude of the working diaphragm movement from an unstressed position and in response to fluid pressure is reduced.

3. The invention defined by claim 1, said sealing means comprising a bowed annulus of soft steel reacting against said body under the pressure of said diaphragm.

4. The invention defined by claim 1, said sealing means including an annular flange, the margin of said diaphragm being positioned between said flange and a part of said body and a bowed annulus of soft steel between said flange and body.

5. In combination, a body member, opposed cylinders projecting therefrom, pistons in said cylinders, normally flat diaphragms closing the inner ends of said cylinders and in contact with said pistons, means sealing the margins of said diaphragms and bowing said diaphragms toward each other, said pistons having heads crowned to stress said diaphragms to correspond with the surface of said piston heads, the radius of curvature of each piston crown being less than that of the diaphragm after being bowed as stated whereby the development of air chambers is avoided.

6. The invention defined by claim 5, said sealing means comprising annular seats in said body, opposed radial flanges on said cylinders and annular locking devices reacting on said body and cylindrical flanges whereby said cylinders are secured to said body and said diaphragms are precompressed.

7. The invention defined by claim 5, together with yielding means operable to project said pistons into said cylinders and preload said diaphragms.

8. In combination, a body member having a radial seat, an incompressible diaphragm peripherally engaging said body seat, a cylindrical sleeve projecting from said body, said sleeve having a radial flange engaging said diaphragm on the side thereof remote from said body seat, said body having opposed straight grooves and sleeve locks slidable in said grooves to hold said sleeve locks in a position to compress the peripheral margin of said diaphragms and bulge the diaphragms into bowed form, and pistons having crowned heads to engage and stress said bowed diaphragm.

9. The invention defined by claim 8, together with means to retain said sleeve locks in position.

10. The invention defined by claim 8, together with fastening means for said body member and adjusting means to determine the release position of said piston, positioning means for said adjusting means, said fastening means and positioning means operable to hold said sleeve locks in assembled relation.

EARL R. PIERCE.
GILBERT K. HAUSE.